United States Patent Office 2,989,537
Patented June 20, 1961

1

2,989,537
PYRAZOLO[2,3-a]IMIDAZOLIDINES
Jean Druey, Riehen, Paul Schmidt, Therwil, and Kurt
Eichenberger, Basel, Switzerland, assignors to Ciba
Pharmaceutical Products Inc., Summit, N.J.
No Drawing. Filed May 26, 1959, Ser. No. 815,827
Claims priority, application Switzerland May 30, 1958
11 Claims. (Cl. 260—309.7)

This invention provides pyrazolo[2:3-a]imidazolidines, their salts and quaternary ammonium compounds and a process for the manufacture thereof.

The ring system of pyrazolo[2:3-a]imidazolidine of the formula

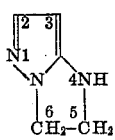

or its tautomeric forms is not hitherto described in the literature. The new compounds can contain on the above fundamental structure suitable substituents, for example, in 2,5 and/or 6-position low alkyl radicals, e.g. methyl or ethyl aryl radicals, for example unsubstituted or substituted phenyl radicals, such as alkyl-, alkoxy- or halogenophenyl radicals; or in 3-position for example a free or functionally converted carboxyl group, such as a carbalkoxy, carbonamido- or cyano-group or a halogen atom, such as chlorine or bromine; or on the secondary nitrogen atom, for example acyl radicals, such as lower alkanoyl radicals, e.g. acetyl or lower alkyl, e.g. methyl, ethyl or propyl, or aralkyl radicals, e.g. phenyl-lower alkyl radicals, such as benzyl radicals. As quaternary ammonium derivatives, low alkyl ammonium or benzyl ammonium compounds may be especially mentioned.

The new compounds possess valuable pharmacological properties. They also possess sedative and antipyretic action. They can therefore be used as medicaments or as intermediate products for the manufacture thereof.

Of especial value with regard to its antipyretic action is pyrazolo[2:3-a]imidazolidine of the formula

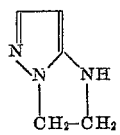

itself and its salts, whereas the corresponding 3-bromo-derivative is characterized by its sedative-hypnotic and anti-virus action.

The new compounds are obtained when a 3-aminopyrazole, containing in 2-position a free hydroxyl group attached by way of a saturated carbon chain of two carbon atoms, is intramolecularly condensed to the pyrazolo[2:3-a]imidazolidine.

In the pyrazole used as starting material the amino group is advantageously unsubstituted and the substituent in 2-position is advantageously a free if desired C-substituted hydroxy ethyl group.

The intramolecular condensation takes place by methods of known type.

Thus, the condensation is carried out, for example, in the presence of dehydrating agents, such as strong acids, for example concentrated sulfuric or hydrochloric acid. When the starting materials contain hydrolysable substituents or free carboxyl groups, they may at the same time be hydrolysed and/or decarboxylated. An example of this is provided, for example, by the case of a cyano group in 4-position, which under the reaction conditions can be hydrolysed to the free carboxyl group, which can then be split out by decarboxylation.

In the resulting pyrazolo-[2:3-a]imidazolidines substituents can, if desired, be introduced or converted by methods of known type. Thus, for example, 3-unsubstituted compounds can be easily halogenated, for example brominated, by methods of known type, and/or compounds with substitutable nitrogen atom can, as above described, be N-acylated, for example, by treatment with acid anhydrides or acid halides, if desired, in the presence of condensing agents, by methods of known type, or they can be substituted by methods of known type, for example with reactive esters of alcohols, for example alkanols or aralkanols, whereby in accordance with the nature of the nitrogen atom entering into reaction tertiary amines or quaternary ammonium compounds are obtained. These reactions can be performed in any sequence desired.

The new compounds are obtained, according to the reaction conditions, in the form of the free compounds or their salts, which can be converted one into the other in the customary manner. Thus free bases can be converted into their acid addition salts, particularly the therapeutically acceptable acid addition salt, for example by reaction with inorganic or organic acids, such as hydrohalic acids, sulfuric acid, nitric acid, perchloric acid, phosphoric acids, formic acid, acetic acid, propionic acid, lactic acid, oxalic acid, succinic acid, malic acid, tartaric acid, citric acid, ascorbic acid, methane sulfonic acid, ethane sulfonic acid, hydroxyethane sulfonic acid, benzoic acid, salicylic acid, p-amino salicylic acid, toluene sulfonic acid or naphthalene sulfonic acids.

Free acid compounds can be converted into their metal salts, such as alkali metal or alkaline earth metal salts.

The pyrazolo[2:3-a]-imidazolidines or their salts can be used in the form of pharmaceutical preparations. The latter contain the specified compounds in admixture with a pharmaceutical organic or inorganic carrier material suitable for enteral or parenteral administration. As such are concerned substances that do not react with the described compounds, for example water, gelatine, lactose, starch, magnesium stearate, talc, vegetable oils, benzyl alcohols, gums, polyalkylene glycols, cholesterol or other known medicament carriers. The pharmaceutical preparations can exist, for example, as tablets or dragees or in liquid form as solutions, suspensions or emulsions. If desired they are sterilized and/or contain auxiliary substances such as preserving, stabilizing, wetting or emulsifying agents. They can also contain other therapeutically valuable substances. The preparations can be produced by customary methods.

The invention also comprises modifications of the process in which a compound obtainable as an intermediate at any stage of the complete process is used as starting material and the remaining step or steps are carried out, or the process is terminated at any desired stage.

The starting materials are known or can be prepared by known methods. 2-(β-hydroxyethyl)-3-aminopyrazoles are described in U.S. Patent No. 2,868,803, filed January 13, 1959 by Jean Druey et al.

The following examples illustrate the invention:

*Example 1*

15.2 grams of 2-(β-hydroxyethyl)-3-amino-4-cyano-pyrazole are heated for 3½ hours to 170° C. in 200 cc. of 75% sulfuric acid. After cooling, the reaction solution is adjusted to pH 9 with concentrated sodium hydroxide solution and extracted with chloroform. After evaporation of the solvent, the chloroform residue is recrystallized from ether. In this manner pyrazolo[2:3-a]-imidazolidine of the formula

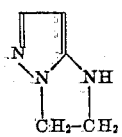

is obtained. The substance is hygroscopic and melts at 68–69° C.

The 2-(β-hydroxyethyl)-3-amino-4-cyano-pyrazole used as starting material is obtained as follows: 48.8 grams of ethoxymethylene malonitrile are dissolved in 500 cc. of ethyl alcohol. The solution is slowly treated with 44 grams of β-hydroxyethyl-hydrazine and the whole boiled under reflux for 10 hours. The product is then evaporated under vacuum and the residue recrystallized from ethyl alcohol. 2-(β-hydroxyethyl)-3-amino-4-cyano-pyrazole of the formula

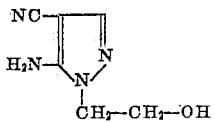

is thus obtained in crystals of m.p. 156–158° C.

*Example 2*

10.9 grams of pyrazolo[2:3-a]imidazolidine are dissolved in 30 cc. of glacial acetic acid and mixed with 101.1 cc. of a solution of bromine in glacial acetic acid containing 0.158 gram of bromine per cc. The reaction solution is filtered and evaporated under a water-jet vacuum. The crystalline residue is mixed with water, given a pH of 5 with 2 N-sodium hydroxide solution, and extracted with chloroform. On evaporation of the chloroform solution there is obtained as residue 3-bromo-pyrazolo[2:3-a]imidazolidine of the formula

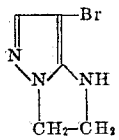

After being recrystallized from a mixture of ether and petroleum ether, the product melts at 110–111° C.

*Example 3*

10.9 grams of pyrazolo[2:3-a]imidazolidine are mixed with 15.9 cc. of acetic anhydride. The product dissolves immediately with considerable evolution of heat. The solution is allowed to stand at room temperature for one hour, then ether is added, and the precipitated crystals are separated by filtering with suction. There is obtained the N-acetyl-pyrazolo[2:3-a]imidazolidine melting at 110–111° C. After one recrystallization from a mixture of acetone and petroleum ether, the melting point is at 111–112° C.

*Example 4*

6.35 grams of 2-(β-hydroxyethyl)-3-amino-pyrazole in 50 cc. of sulfuric acid of 75% strength are heated at 170° C. for 3½ hours. After cooling, the reaction solution is given a pH of 9 with concentrated sodium hydroxide solution, then extracted with chloroform. The solvent is evaporated and the chloroformic residue recrystallized from ether. There is obtained the pyrazolo[2:3-a]imidazolidine described in Example 1.

The 2-(β-hydroxyethyl)-3-amino-pyrazole used as starting material is obtained as follows:

101.5 grams of ethoxy-methylene-cyanacetic acid ethyl ester in 700 cc. of absolute alcohol are refluxed for 10 hours with 66 grams of 70% β-(hydroxy-ethyl)-hydrazine. On evaporation of the alcohol there is obtained as residue the 2-(β-hydroxy-ethyl)-3-amino-4-carbethoxy-pyrazole of the formula

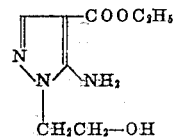

Under a pressure of 0.3 mm., the product distills at 180° C. and melts at 84–87° C.

19.9 grams of 2-(β-hydroxyethyl)-3-amino-4-carbethoxy-pyrazole are heated at the boil for 2 hours with 250 cc. of 2 N-sodium hydroxide solution. After cooling, a small amount of undissolved matter is filtered off and the filtrate is given a pH of 3 with 6 N-hydrochloric acid, the 2-(β-hydroxyethyl)-3-amino-4-carboxy-pyrazole of the formula

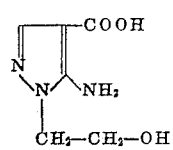

precipitating. The product melts (and decomposes) at 145–146° C.

138 grams of 2-(β-hydroxyethyl)-3-amino-4-carboxy-pyrazole are decarboxylated for half an hour at 160–170° C. The reaction product is then distilled. There is obtained the 2-(β-hydroxyethyl)-3-amino-pyrazole of the formula

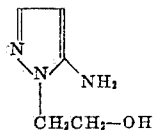

of boiling point 133–140° C. (under a pressure of 0.04 mm.). Its melting point is at 108–109° C.

*Example 5*

3.34 grams of sodium are heated to 100° C. for 5 hours while being vibrated together with 10.9 grams of pyrazolo[2,3-a]imidazolidine in 130 cc. of absolute toluene. Then, at a temperature of 100° C., 10.7 cc. of dimethyl sulfate are added dropwise and heating at 100° C. is continued for another 2 hours. After cooling, the toluene solution is filtered and evaporated. The residue is subjected to fractional distillation and the N-methyl-pyrazolo[2,3-a] imidazolidine obtained which under a pressure of 12 mm. of mercury boils at 113° C.

*Example 6*

5.7 cc. of dimethyl sulfate are added dropwise at room temperature to a solution of 5.45 grams of pyrazolo[2,3-a]imidazolidine in 50 cc. of 2 N-sodium hydroxide solution. Stirring is continued at room temperature for 12 hours which operation is followed by extraction with chloroform at a pH of 8. The chloroform is evaporated and the chloroformic residue subjected to fractional distillation under a water-jet vacuum. There is obtained in this manner the N-methyl-pyrazolo[2,3-a]imidazolidine described in Example 5.

*Example 7*

1.23 grams of the N-methyl-pyrazolo[2,3-a]imidazolidine described in Example 5 are dissolved in 10 cc. of glacial acetic acid and treated with 19.6 cc. of a solution of bromine in glacial acetic acid containing 81.6 mg. of bromine per cc. The reaction solution is then evaporated, the residue dissolved in water and the solution given a pH of 8 with N-sodium hydroxide solution, after which the N-methyl-3-bromo-pyrazolo[2,3-a]imidazolidine separates. A test portion purified by sublimation melts at 52–53° C.

Example 8

3.02 grams of the N-acetyl-pyrazolo[2,3-a]imidazolidine described in Example 3 are dissolved in 10 cc. of glacial acetic acid and treated with 38.2 cc. of a solution of bromine in glacial acetic acid containing 83.5 mg. of bromine per cc. The crystals which separate from the reaction solution are filtered off with suction and dissolved in water. The acid aqueous solution is given a pH of 8 with N-sodium hydroxide solution after which the N-acetyl-3-bromo-pyrazolo[2,3-a]imidazolidine of melting point 127–128° C. separates.

What is claimed is:

1. A member selected from the group consisting of pyrazolo[2.3-a]imidazolidines of the formula

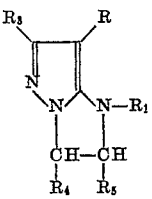

and their lower alkyl ammonium, benzylammonium and therapeutically useful acid addition and alkali and alkaline earth metal salts, in which formula R stands for a member selected from the group consisting of hydrogen, carboxy, carb-lower alkoxy, carbamido, cyano and halogen, $R_1$ for a member selected from the group consisting of hydrogen, lower alkanoyl and lower alkyl and $R_3$, $R_4$ and $R_5$ each stands for a member selected from the group consisting of hydrogen and lower alkyl.

2. Pyrazolo[2:3-a]imidazolidine.
3. Therapeutically useful acid addition salts of the compound of claim 2.
4. 3-bromo-pyrazolo[2:3-a]imidazolidine.
5. Therapeutically useful acid addition salts of the compound of claim 4.
6. N-methyl-3-bromopyrazolo[2:3-a]imidazolidine.
7. Therapeutically useful acid addition salts of the compound of claim 6.
8. N-methyl-pyrazolo[2:3-a]imidazolidine.
9. Therapeutically useful acid addition salts of the compound of claim 8.
10. N-acetyl-pyrazolo[2:3-a]imidazolidine.
11. N-acetyl-3-bromo-pyrazolo[2:3-a]imidazolidine.

No references cited.